(12) United States Patent
Ohnishi et al.

(10) Patent No.: US 11,496,642 B2
(45) Date of Patent: Nov. 8, 2022

(54) IMAGE FORMING APPARATUS, IMAGE FORMING METHOD, AND IMAGE FORMING SYSTEM FOR CALCULATING AN IMAGE FORMING CONDITION BASED ON CHARACTERISTIC INFORMATION OF A RECORDING MEDIUM

(71) Applicants: Kazushige Ohnishi, Kanagawa (JP); Tomoaki Nakano, Kanagawa (JP)

(72) Inventors: Kazushige Ohnishi, Kanagawa (JP); Tomoaki Nakano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/249,841

(22) Filed: Mar. 16, 2021

(65) Prior Publication Data

US 2021/0297545 A1 Sep. 23, 2021

(30) Foreign Application Priority Data

Mar. 18, 2020 (JP) .............................. JP2020-048475

(51) Int. Cl.
*H04N 1/04* (2006.01)
*H04N 1/00* (2006.01)

(52) U.S. Cl.
CPC ....... *H04N 1/00835* (2013.01); *H04N 1/0075* (2013.01); *H04N 1/00652* (2013.01); *H04N 1/00716* (2013.01); *H04N 1/00755* (2013.01)

(58) Field of Classification Search
None
See application file for complete search history.

(56) References Cited

U.S. PATENT DOCUMENTS

| | | | | |
|---|---|---|---|---|
| 7,646,479 B2* | 1/2010 | Kokubo | ............. | H04N 1/00681 356/239.1 |
| 7,715,739 B2* | 5/2010 | Umeda | .............. | H04N 1/00037 399/45 |
| 7,750,330 B2* | 7/2010 | Murata | .............. | H04N 1/00724 250/559.4 |
| 7,852,521 B2* | 12/2010 | Aoki | .................... | H04N 1/0075 358/474 |
| 2011/0080571 A1* | 4/2011 | Aoki | ...................... | G03B 27/54 355/67 |
| 2011/0164887 A1* | 7/2011 | Takenaka | ........... | G03G 15/6508 399/16 |
| 2011/0222927 A1* | 9/2011 | Yamashina | ........ | G03G 15/5029 399/328 |

(Continued)

FOREIGN PATENT DOCUMENTS

| | | |
|---|---|---|
| JP | 10-160687 | 6/1998 |
| JP | 11-249353 | 9/1999 |

(Continued)

*Primary Examiner* — Dung D Tran
(74) *Attorney, Agent, or Firm* — IPUSA, PLLC

(57) ABSTRACT

An image forming apparatus includes processing circuitry and an image forming device. The processing circuitry is configured to acquire characteristic information of a recording medium measured, and apply a preset calculation criterion to the characteristic information to calculate an image forming condition. The image forming device is configured to form an image on the recording medium based on the image forming condition calculated by the processing circuitry.

7 Claims, 16 Drawing Sheets

(56) References Cited

U.S. PATENT DOCUMENTS

| | | | | |
|---|---|---|---|---|
| 2012/0063790 A1* | 3/2012 | Ogawa | ............... | G03G 15/6573 399/45 |
| 2013/0194573 A1 | 8/2013 | Ohba et al. | | |
| 2015/0062582 A1 | 3/2015 | Adachi et al. | | |
| 2020/0192262 A1* | 6/2020 | Usui | .................. | G03G 15/5029 |
| 2020/0285177 A1* | 9/2020 | Yamada | ............... | G03G 15/205 |

FOREIGN PATENT DOCUMENTS

| | | |
|---|---|---|
| JP | 2006-062842 | 3/2006 |
| JP | 2012-208103 | 10/2012 |
| JP | 2015-108611 | 6/2015 |

\* cited by examiner

FIG. 17

| TYPE INFORMATION | | | | | CHARACTERISTIC INFORMATION | | | | | | IMAGE FORMING CONDITION INFORMATION | | |
|---|---|---|---|---|---|---|---|---|---|---|---|---|---|
| TYPE NAME | SIZE | BASIS WEIGHT (gsm) | CLASSIFICATION | COATING TYPE | A (mV) | B (mV) | C (mV) | D (mV) | E (mV) | F (mV) | TRANSFER CURRENT VALUE (mV) | RATED TEMPERATURE (°C) | ... |
| COATED SHEET A | A4 | 120 | PLAIN PAPER | GLOSS COATING | 1252 | 1125 | 2288 | 452 | 1132 | 842 | 40 | 140 | ... |
| PLAIN PAPER B | A3 | 75 | PLAIN PAPER | PLAIN PAPER | 852 | 725 | 1588 | 152 | 832 | 542 | 40 | 120 | ... |
| COLOR PAPER C | A3 | 75 | COLOR PAPER (YELLOW) | PLAIN PAPER | 403 | 433 | 811 | 53 | 242 | 124 | 44 | 155 | ... |
| ... | | | | | ... | ... | ... | ... | ... | ... | ... | ... | ... |

| MATCHING RATE | TYPE NAME | SIZE | BASIS WEIGHT | CLASSIFICATION | COATING TYPE |
|---|---|---|---|---|---|
| 98% | D MATTE | A3 | 300 gsm | PLAIN PAPER | MATTE COATING |
| 95% | MATTE PAPER E | DLT | 290 gsm | PLAIN PAPER | MATTE COATING |
| 98% | F COATING | A4 | 310 gsm | PLAIN PAPER | MATTE COATING |
| ... | | | | | |

IMAGE FORMING APPARATUS, IMAGE FORMING METHOD, AND IMAGE FORMING SYSTEM FOR CALCULATING AN IMAGE FORMING CONDITION BASED ON CHARACTERISTIC INFORMATION OF A RECORDING MEDIUM

CROSS-REFERENCE TO RELATED APPLICATION

This patent application is based on and claims priority pursuant to 35 U.S.C. § 119(a) to Japanese Patent Application No. 2020-048475, filed on Mar. 18, 2020, in the Japan Patent Office, the entire disclosure of which is hereby incorporated by reference herein.

BACKGROUND

Technical Field

Embodiments of the present disclosure relate to an image forming apparatus, an image forming method, and an image forming system.

Related Art

As a recording medium such as a recording sheet of paper on which an image is to be formed by an image forming apparatus, various types of recording media different in, for example, surface state, thickness, and material are distributed. Therefore, in order to prevent the occurrence of abnormality in image quality and conveyance quality, an image forming apparatus has been developed in which various setting conditions such as transfer, fixing, and conveyance are changed according to the type and state of a recording medium.

For example, in order to determine the types of various recording media, a method is proposed in which the surface of a recording medium is irradiated with light and the amount of reflected light of the irradiated light is measured to identify the brand or the like of the recording medium.

SUMMARY

According to an aspect of the present disclosure, there is provided an image forming apparatus that includes processing circuitry and an image forming device. The processing circuitry is configured to acquire characteristic information of a recording medium measured, and apply a preset calculation criterion to the characteristic information to calculate an image forming condition. The image forming device is configured to form an image on the recording medium based on the image forming condition calculated by the processing circuitry.

According to another aspect of the present disclosure, there is provided an image forming method that includes acquiring, applying, and forming. The acquiring acquires characteristic information of a recording medium measured. The applying applies a preset calculation criterion to the characteristic information to calculate an image forming condition. The forming forms an image on the recording medium based on the image forming condition calculated.

According to still another aspect of the present disclosure, there is provided an image forming system that includes an image forming apparatus and a measuring apparatus. The measuring apparatus is configured to measure characteristic information of a recording medium and transmit the characteristic information measured, to the image forming apparatus. The image forming apparatus includes processing circuitry and an image forming device. The processing circuitry is configured to acquire the characteristic information from the measuring apparatus, and apply a preset calculation criterion to the characteristic information to calculate an image forming condition. The image forming device is configured to form an image on the recording medium based on the image forming condition calculated by the processing circuitry.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 17 is a diagram illustrating an example of recording medium information; and FIG. 18 is a diagram illustrating an example of display on a display unit.

Figure 1:
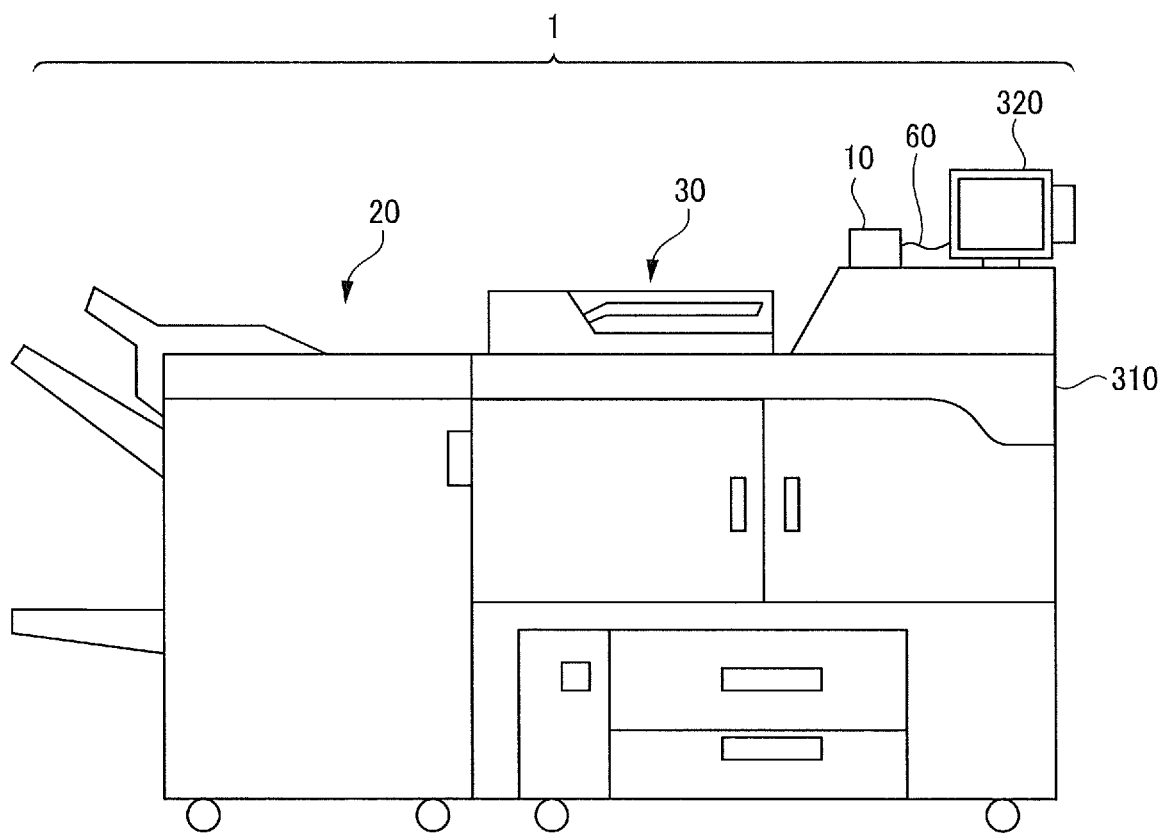
FIG. 1 is a diagram of an outline of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to drawings, descriptions are given below of embodiments of the present disclosure. It is to be noted that elements (for example, mechanical parts and components) having the same functions and shapes are denoted by the same reference numerals throughout the specification and redundant descriptions are omitted.

Hereinafter, embodiments of the present disclosure are described with reference to the drawings.

FIG. 1 is a diagram illustrating an outline of an image forming system according to an embodiment of the present disclosure.

An image forming system 1 according to the present embodiment includes a measuring apparatus 10, a recording-medium post-processing apparatus 20, and an image forming apparatus 30.

The measuring apparatus 10 is an apparatus that measures characteristic information of a recording medium. The characteristic information is information indicating a characteristic(s) of a recording medium, and includes, for example, values such as an amount of specular reflected light, an amount of diffuse reflected light, an amount of internal reflected light, and an amount of transmitted light of light with which the recording medium is irradiated, and a thickness of the recording medium.

The measuring apparatus 10 is communicably connected to the image forming apparatus 30 via a communication cable 60. The measuring apparatus 10 may be communicable with a personal computer (PC) by wired or wireless communication means such as a universal serial bus (USB) cable or a local area network (LAN) cable.

The image forming apparatus 30 and the recording-medium post-processing apparatus 20 are communicably connected to each other. In the image forming system 1, after the image forming apparatus 30 forms an image on a recording medium P, the recording-medium post-processing apparatus 20 receives the recording medium P from the image forming apparatus 30 and performs various types of post-processing on the received recording medium P.

For example, the recording-medium post-processing apparatus 20 performs an end binding process, a center folding process, and the like. The center folding process includes a saddle stitching process. The recording-medium post-processing apparatus 20 has a discharge mode, an end binding mode, and a center folding mode as operation modes.

The image forming apparatus 30 is an apparatus that forms an image on a recording medium. The image forming apparatus 30 includes, for example, a main unit 310 and an operation unit 320. The main unit 310 forms an image on a recording medium. The operation unit 320 transmits various instructions to the main unit 310 in response to a user operation. The operation unit 320 is communicably connected to the measuring apparatus 10 via the communication cable 60.

Figure 2:
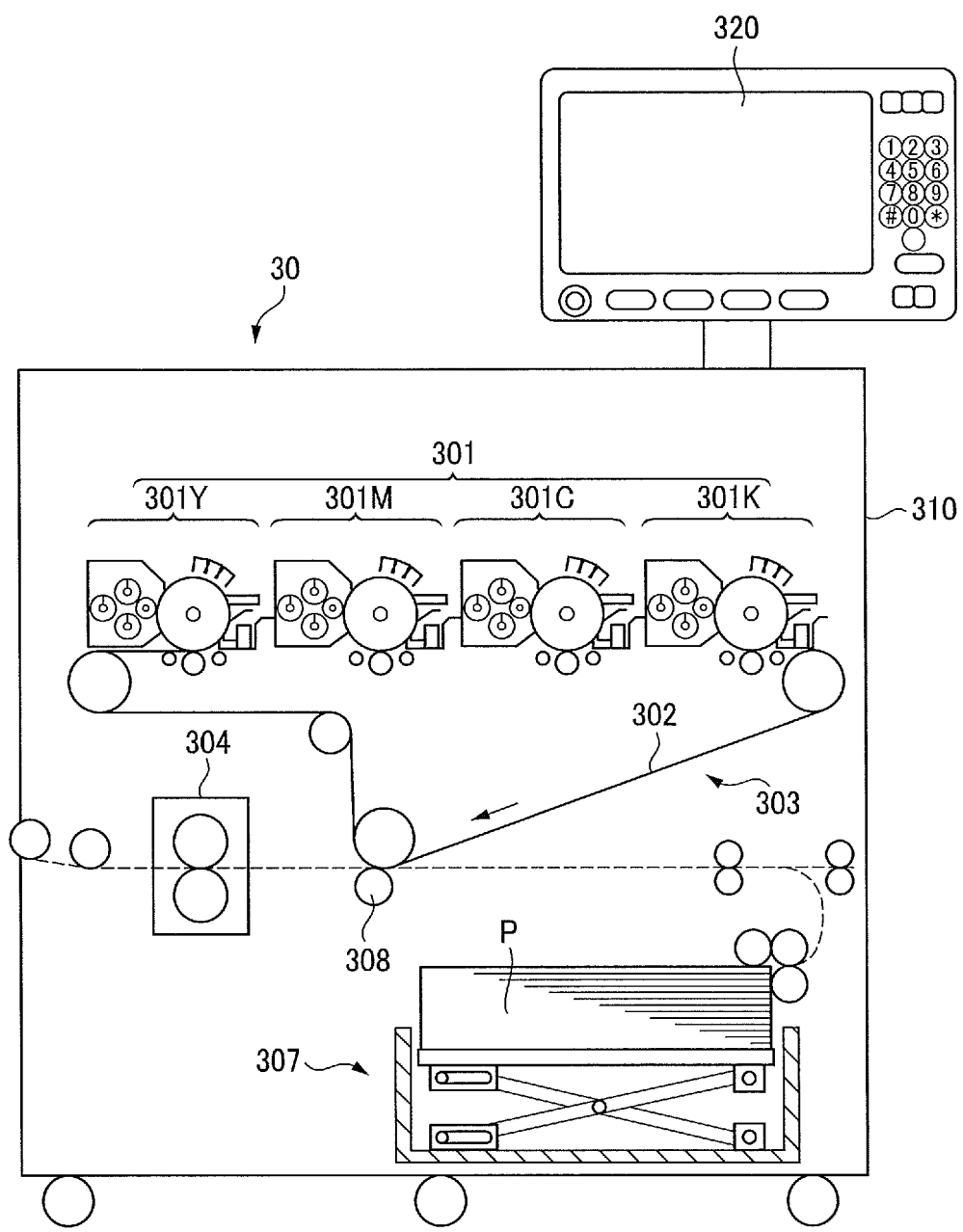
FIG. 2 is a diagram illustrating an outline of an image forming apparatus according to an embodiment of the present disclosure.

FIG. 2 is a diagram illustrating an outline of an image forming apparatus according to an embodiment of the present disclosure.

Note that reference characters Y, M, C, and K represent yellow, magenta, cyan, and black, respectively. A conveyance path of the recording medium P is indicated by a broken line.

A recording medium P fed from a feed tray 307 provided inside the main unit of the image forming apparatus 30 or from an external feed device is conveyed to the image forming apparatus 30. The feed tray 307 and the external feed device have the same basic configuration. The image forming apparatus 30 includes four toner-image forming units 301Y, 301M, 301C, and 301K as image forming devices to generate toner images of yellow, magenta, cyan, and black, respectively.

The four toner-image forming units 301Y, 301M, 301C, and 301K use Y, C, M, and K toners of different colors as image forming materials but have the same configurations except for the toner colors to be used. Hereinafter, the four toner-image forming units 301Y, 301M, 301C, and 301K may be collectively referred to as toner-image forming units 301 unless not distinguished from one another.

The image forming apparatus 30 includes an intermediate transfer belt 302 as an intermediate transfer member, an intermediate transfer unit 303 as a transfer unit, a fixing device 304 as a fixing unit, and a secondary transfer unit 308 below the toner-image forming units 301.

The intermediate transfer unit 303 endlessly moves the intermediate transfer belt 302 with the intermediate transfer belt 302 being stretched by a plurality of stretching rollers. Toner images developed by the toner-image forming units 301 are transferred to the intermediate transfer belt 302 and further transferred to a recording medium P by the secondary transfer unit 308.

The fixing device 304 is located below the intermediate transfer unit 303 and fixes the toner images to the recording medium P. The recording medium P is conveyed to the recording-medium post-processing apparatus 20.

Next, a hardware configuration of the measuring apparatus 10 is described.

Figure 3A:
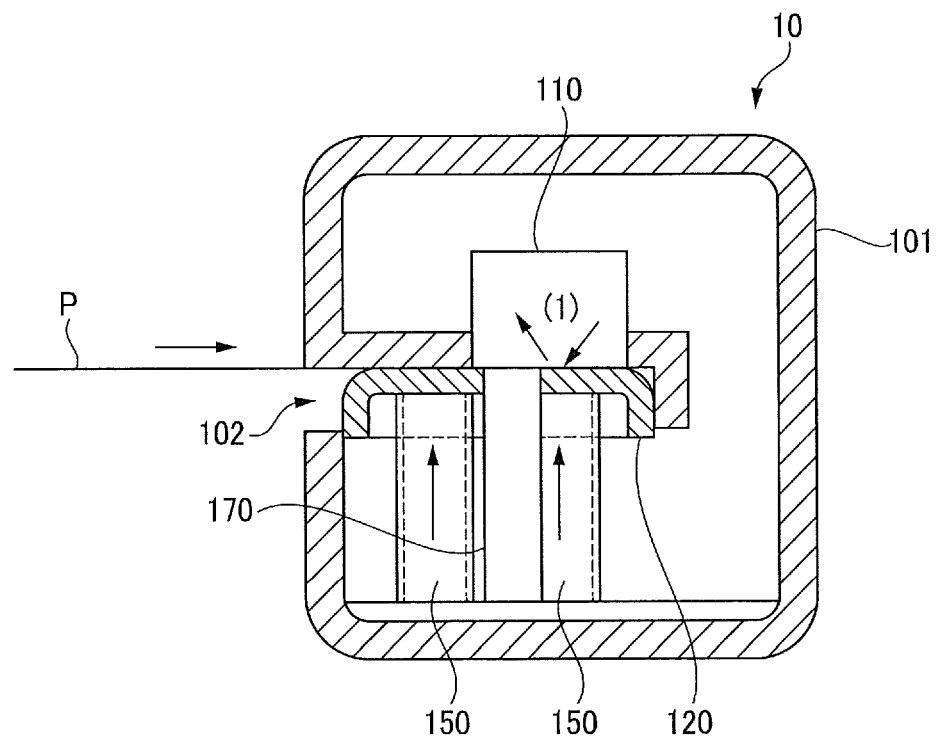
FIG. 3A is a cross-sectional view of a measuring apparatus according to an embodiment of the present disclosure.
Figure 3B:
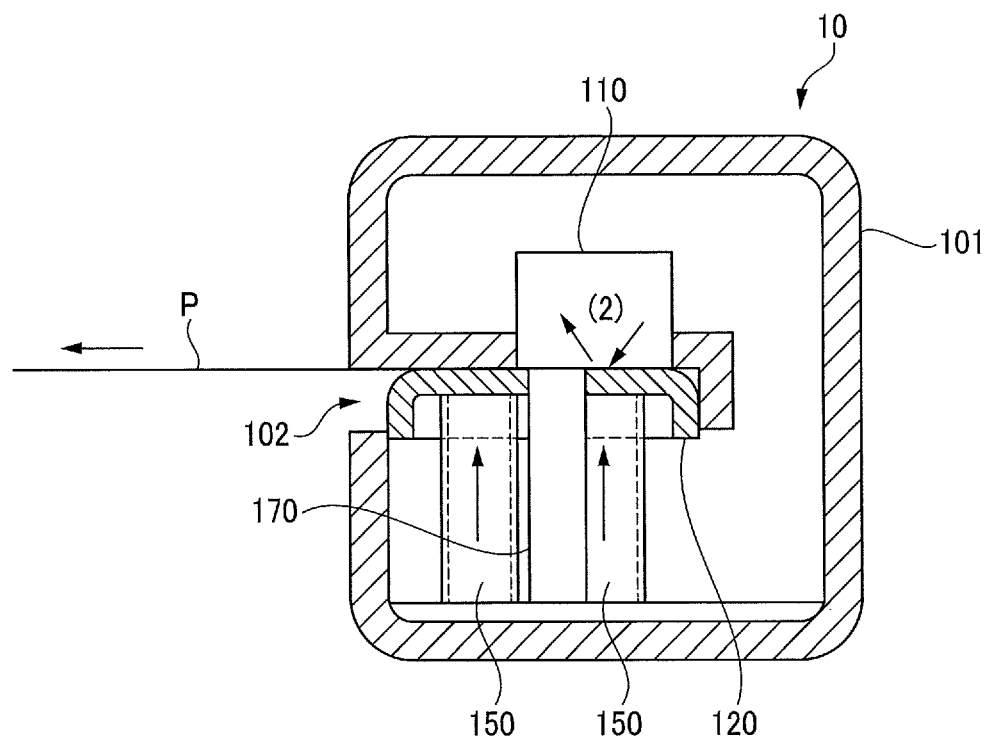
FIG. 3B is another cross-sectional view of the measuring apparatus of FIG. 3A.

FIG. 3A is a cross-sectional view of a measuring apparatus according to an embodiment of the present disclosure. FIG. 3B is another cross-sectional view of the measuring apparatus. Specifically, FIG. 3A illustrates a state in which a recording medium P is inserted into an opening 102 of the measuring apparatus 10. FIG. 3B illustrates a state in which the recording medium P is removed from the opening 102 of the measuring apparatus 10.

The measuring apparatus 10 includes an exterior case 101, a light-amount measuring sensor 110, a recording-medium mount table 120, a biasing member 150, and a thickness measuring sensor 170.

The light-amount measuring sensor 110 is provided at an upper portion inside the exterior case 101 of the measuring apparatus 10. The recording-medium mount table 120 and the thickness measuring sensor 170 are provided in a lower portion inside the exterior case 101.

The recording-medium mount table 120 is installed at a position facing the light-amount measuring sensor 110 with reference to a gap into which the recording medium P is inserted. The thickness measuring sensor 170 is located upstream of the measurement position of the light-amount measuring sensor 110 in the insertion direction of the recording medium P into the opening 102.

Accordingly, the thickness of the recording medium P can be measured by the thickness measuring sensor 170 by inserting the recording medium P at least to the measurement position so that the light amount can be measured by the light-amount measuring sensor 110.

The thickness measuring sensor 170 may be arranged side by side with the light-amount measuring sensor 110 in an upper portion inside the exterior case 101. The position of the thickness measuring sensor 170 may be any position as long as the thickness measuring sensor 170 can measure the thickness of the recording medium P inserted into the opening 102.

Further, the biasing member 150 such as a spring is provided on the opposite side of the light-amount measuring sensor 110 with respect to the recording-medium mount table 120. The recording-medium mount table 120 is urged by the biasing member 150 in a direction indicated by arrows in FIGS. 3A and 3B, in other words, toward the light-amount measuring sensor 110.

Figure 4:
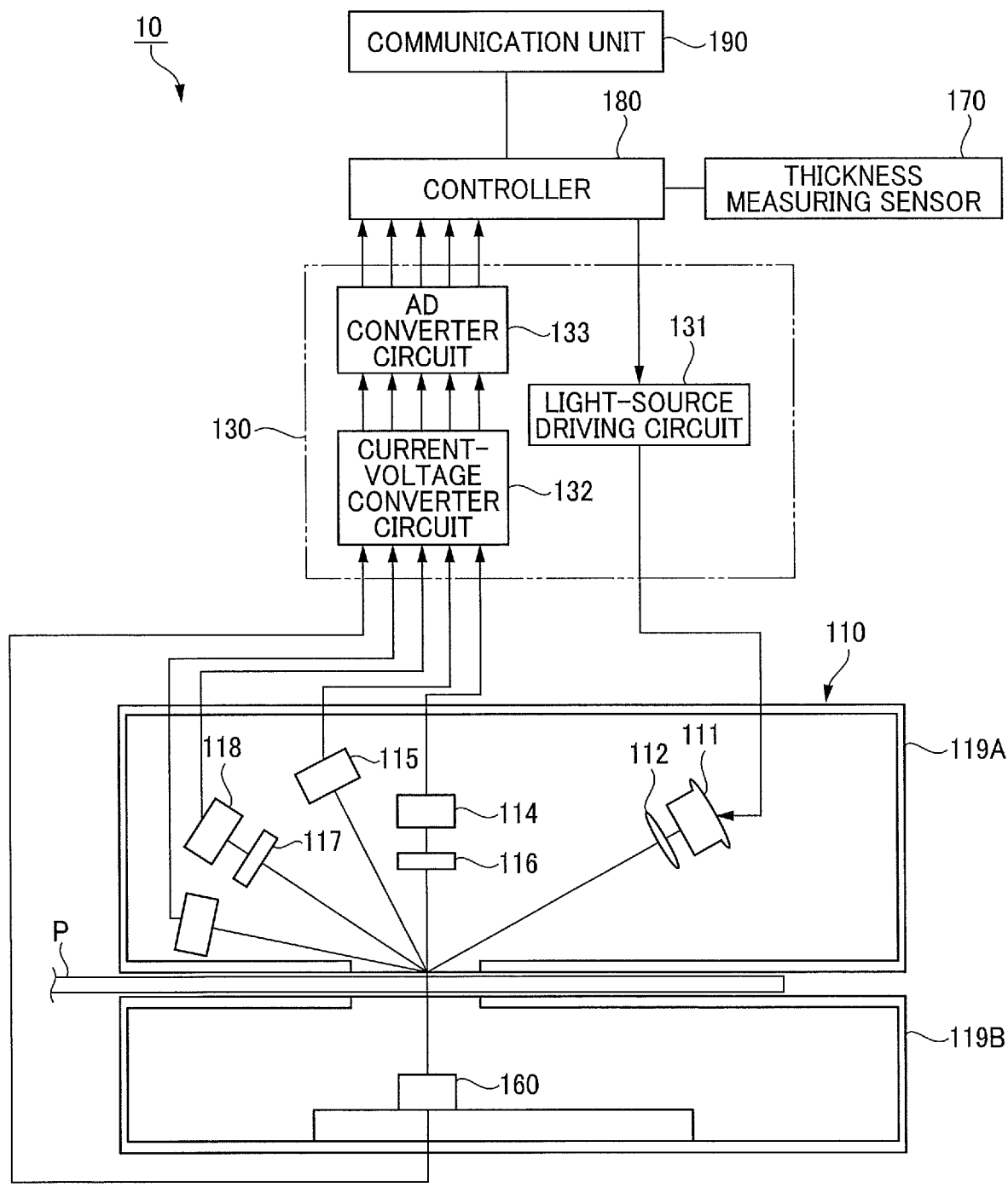
FIG. 4 is a diagram illustrating an example of functions of the measuring apparatus.

FIG. 4 is a diagram illustrating an example of functions of the measuring apparatus. The measuring apparatus 10 includes the light-amount measuring sensor 110, a processing device 130, the thickness measuring sensor 170, a controller 180, and a communication unit 190.

The light-amount measuring sensor 110 includes a light source 111, a collimator lens 112, light receivers 113, 114, 115, 118, and 160, polarization filters 116 and 117, and dark boxes 119A and 119B in which the foregoing components are housed. Each of the dark boxes 119A and 119B is a metallic box member, for example, an aluminum box member, and the surfaces of the dark boxes 119A and 119B are subjected to black alumite treatment in order to reduce the influence of disturbance light, stray light, and the like.

Each of the light receivers 113, 114, 115, 118, and 160 receives light emitted from the light source 111 and reflected by or transmitted through a recording medium P, and outputs an electric signal (current signal) indicating the amount of received light to the processing device 130.

The processing device 130 includes a light-source driving circuit 131, a current-voltage conversion circuit 132, and an analog-digital (AD) conversion circuit 133. The processing device 130 is fixed to the dark box 119A.

The light-source driving circuit 131 outputs a light source driving signal to the light source 111 in response to an instruction from the controller 180. The current-voltage conversion circuit 132 converts a current signal from each light receiver into a voltage signal. The AD conversion circuit 133 converts the analog signal input via the current-voltage conversion circuit 132 into a digital signal, and outputs the converted digital signal to the controller 180.

The light source 111 includes a plurality of light emitting units. Each of the light emitting units is a vertical cavity surface emitting laser (VCSEL). In other words, the light source 111 includes a surface emitting laser array (i.e., a VCSEL array).

Figure 5:
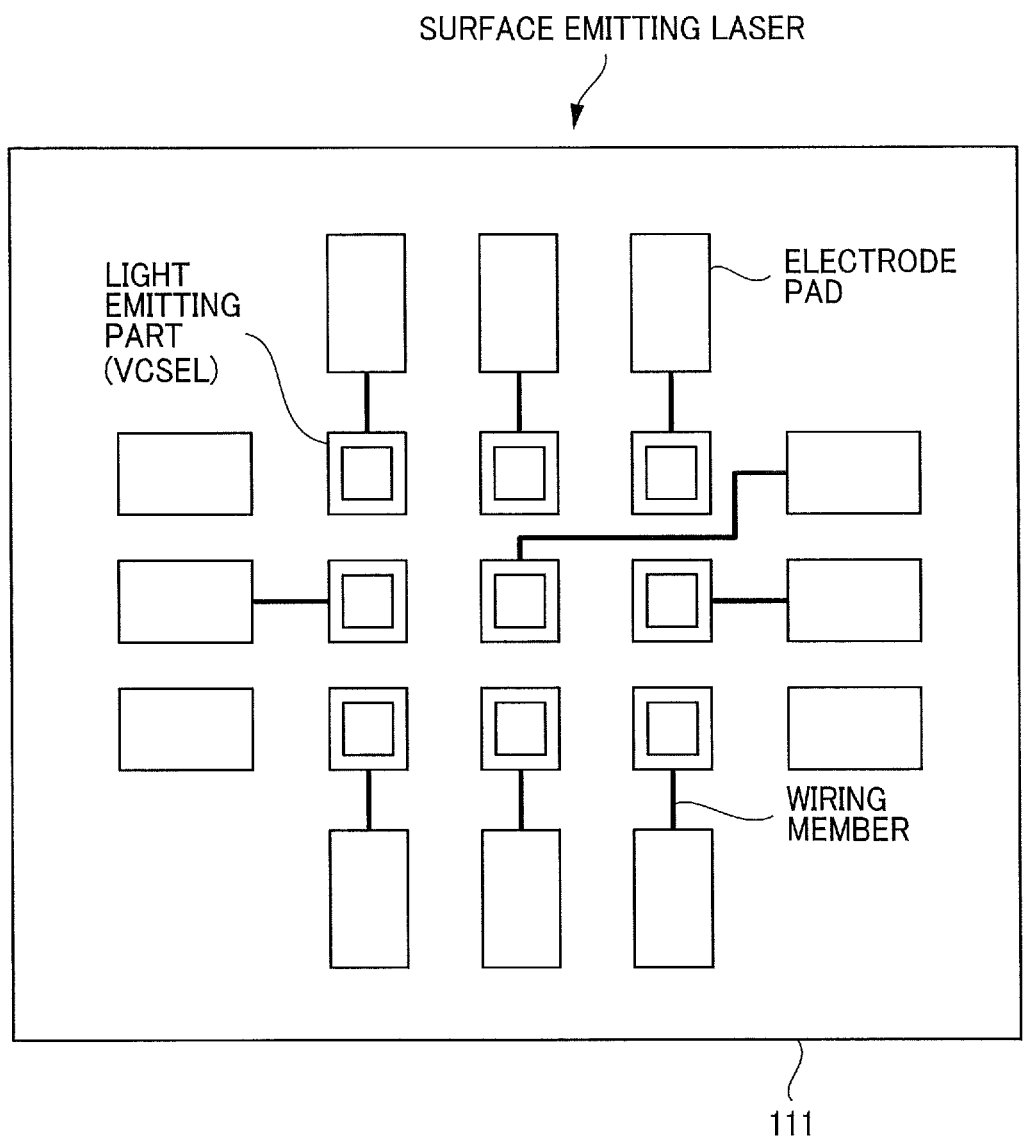
FIG. 5 is a diagram illustrating an outline of a surface emitting laser array according to an embodiment of the present disclosure.

FIG. 5 is a diagram illustrating an example of an outline of the surface emitting laser array.

As illustrated in FIG. 5 as an example, the light source 111 includes a surface emitting laser array in which nine light emitting units are two-dimensionally arranged.

Figure 6:
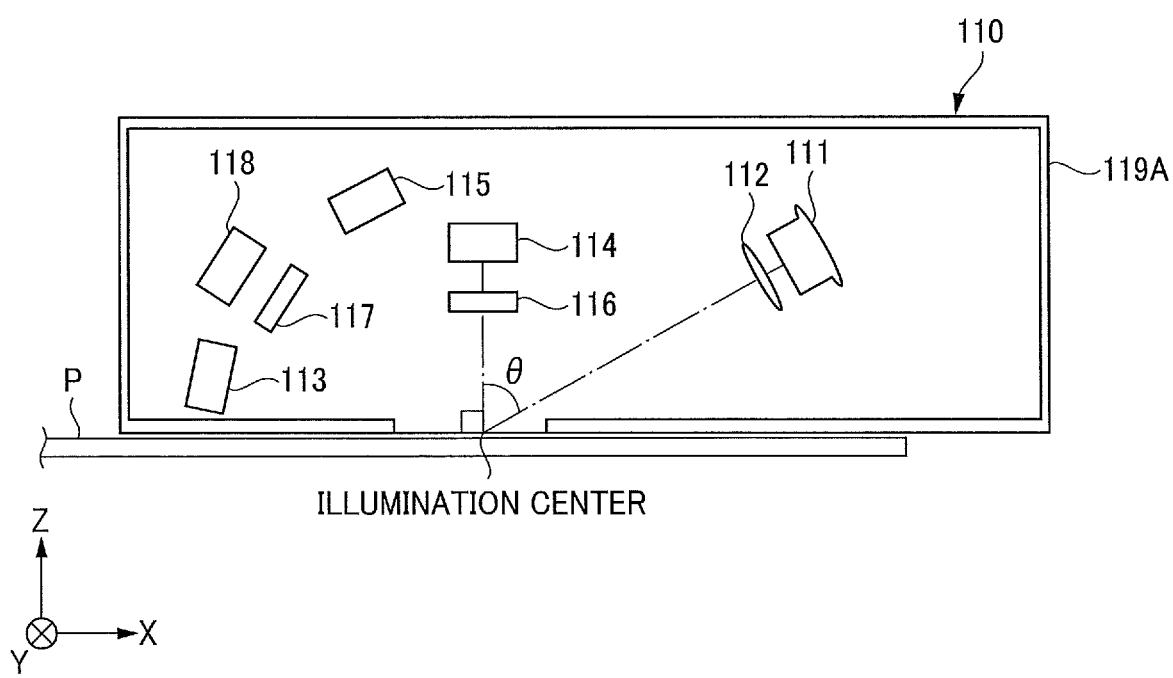
FIG. 6 is a diagram illustrating an incident angle of light from a light source to a recording medium.

FIG. 6 is a diagram illustrating an incident angle of light from the light source to a recording medium.

The light source 111 is disposed so that a recording medium P is irradiated with linearly polarized light of s-polarization. The incident angle θ of the light from the light source 111 to the recording medium P is, for example, 80°. The light source 111 is turned on or off by the processing device 130 described later.

The collimator lens 112 is disposed on the optical path of the light emitted from the light source 111, and refracts the transmitted light into substantially parallel light. The light that has passed through the collimator lens 112 passes through an opening provided in the dark box 119A and illuminates the recording medium P. Hereinafter, the center of the illumination area on the surface of the recording medium P is referred to as an "illumination center". The light that has passed through the collimator lens 112 is also referred to as "irradiation light".

When light is incident on a boundary surface of a medium, a plane including an incident ray and a normal to the boundary surface at an incident point is referred to as an "incidence plane". Hereinafter, an incidence plane of a light ray incident on the illumination center is defined as an incidence plane of the recording medium P. In other words, a plane including the illumination center and parallel to the XZ plane is the incidence plane of the recording medium P.

In the following description, the terms "s-polarized light" and "p-polarized light" are used not only for light incident on the recording medium P but also for reflected light. Specifically, with reference to the polarization direction of the incident light on the recording medium P, the same polarization direction as the incident light (here, s-polarized light) in the plane of incidence is referred to as s-polarized light, and the polarization direction orthogonal to the s-polarized light is referred to as p-polarized light.

The polarization filter 116 is disposed in +Z direction of the illumination center. The polarization filter 116 is a polarization filter that transmits p-polarized light and blocks s-polarized light. Instead of the polarization filter 116, a polarization beam splitter having an equivalent function may be used.

Figure 7:
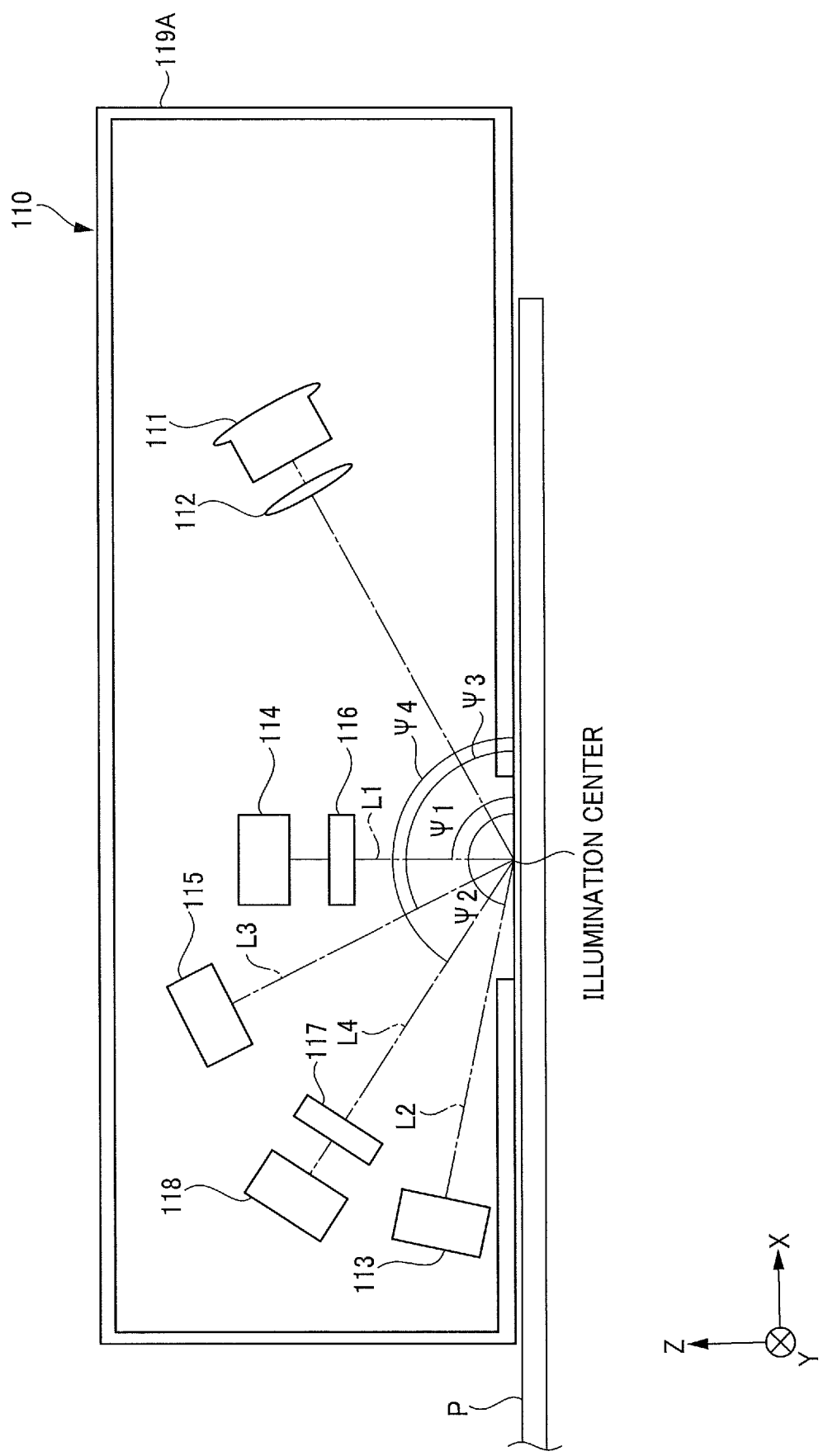
FIG. 7 is a diagram illustrating angles of light received by light receivers.

FIG. 7 is a diagram illustrating angles of light received by the light receivers.

The light receiver 114 is disposed in the +Z direction of the polarization filter 116 and receives light transmitted through the polarization filter 116. As an example, an angle Ψ1 formed by a line L1 connecting the illumination center, the center of the polarization filter 116, and the center of the light receiver 114 and the front surface of the recording medium P is 90°.

The light receiver 113 is disposed in −X direction of the illumination center with respect to the X-axis direction. As an example, an angle Ψ2 formed by a line L2 connecting the illumination center and the center of the light receiver 113 and the front surface of the recording medium P is 170°. The center of the light source 111, the illumination center, the center of the polarization filter 116, and the centers of the light receivers are substantially on the same plane.

Incidentally, the reflected light from the recording medium P when the recording medium P is illuminated can be considered as being divided into the reflected light reflected on the surface of the recording medium P and the reflected light reflected inside the recording medium P. The reflected light reflected by the surface of the recording medium P can be considered to be divided into specular reflected light and diffuse reflected light.

Figure 8A:
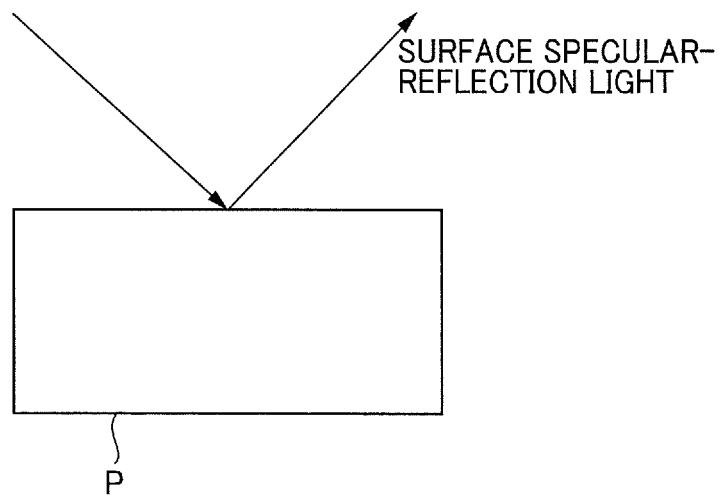
FIG. 8A is a diagram illustrating surface specular reflected light.
Figure 8B:
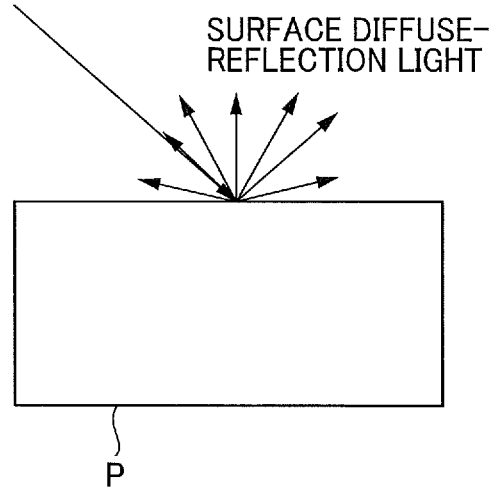
FIG. 8B is a diagram illustrating surface diffuse reflected light.
Figure 8C:
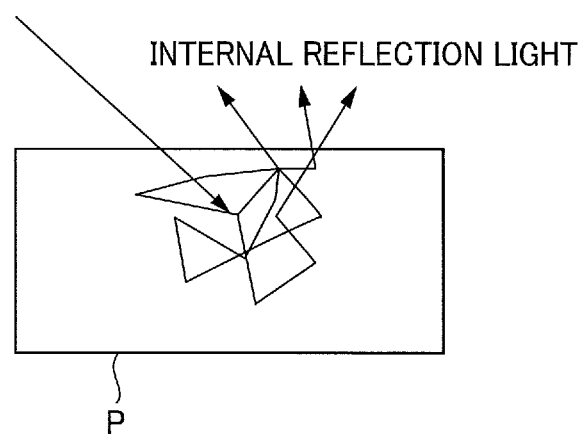
FIG. 8C is a diagram illustrating internal reflected light.

FIG. 8A is a diagram illustrating surface specular reflected light. FIG. 8B is a diagram illustrating surface diffuse reflected light. FIG. 8C is a diagram illustrating internal reflected light.

Hereinafter, the reflected light specularly reflected by the surface of the recording medium P is also referred to as "surface specular reflected light", and the reflected light diffusely reflected by the surface of the recording medium P is also referred to as "surface diffuse reflected light" (see FIGS. 8A and 8B). The surface of the recording medium P includes flat portions and slope portions, and the smoothness of the surface of the recording medium is determined by the ratio of the flat portions and the slope portions.

The light reflected by the flat portions is the surface specular reflected light, and the light reflected by the slope portions is the surface diffuse reflected light. The surface diffuse reflected light is completely scattered and reflected light, and the reflection direction is considered to be isotropic. As the smoothness increases, the amount of surface specular reflected light increases.

When the recording medium P is a general printing sheet of paper, the reflected light from the inside of the recording medium P is only diffuse reflected light because the light is multiply scattered in fibers inside the recording medium P. Hereinafter, the reflected light from the inside of the recording medium P is also referred to as "internal reflected light" (see FIG. 8C). Similarly to the surface diffuse reflected light, the internal reflected light is completely scattered and reflected light. The reflection direction of the internal reflected light is considered to be isotropic.

The polarization directions of the surface specular reflected light and the surface diffuse reflected light directed to the light receivers 113, 114, 115, 118, and 160 are the same as the polarization direction of the incident light. When the incident light is reflected by a surface included in the surface of the recording medium P and inclined with respect to the incident direction, the polarization direction is rotated.

Here, since the center of the light source, the illumination center, and the center of each light receiver are on the same plane, the reflected light whose polarization direction is rotated on the surface of the recording medium P is not reflected toward any light receiver. On the other hand, it is considered that the light entering the inside of the recording medium P is transmitted through fibers and optically rotated while being multiply scattered, and the polarization direction is rotated. Accordingly, the polarization direction of the internal reflected light is rotated with respect to the polarization direction of the incident light.

Figure 9:
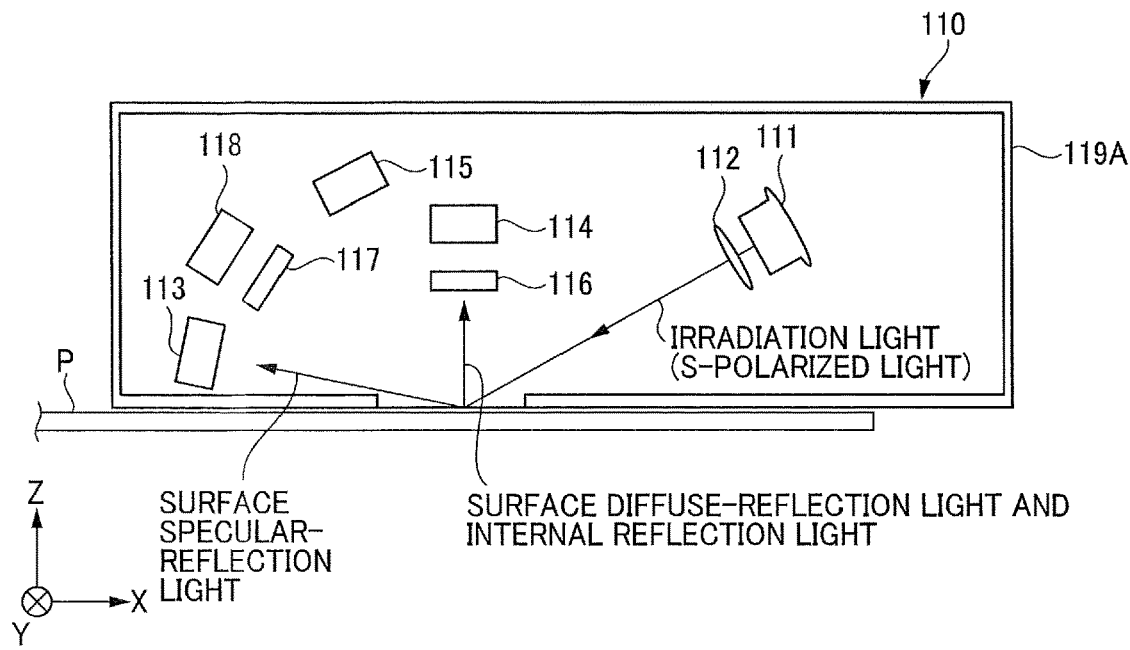
FIG. 9 is a diagram illustrating light incident on a polarization filter.

FIG. 9 is a diagram illustrating light incident on the polarization filter.

Reflected light in which surface diffuse reflected light and internal reflected light are mixed is incident on the polarization filter 116. Since the surface diffuse reflected light is the same s-polarized light as the incident light, the surface diffuse reflected light is blocked by the polarization filter 116. On the other hand, since the s-polarized light and the p-polarized light are mixed in the internal reflected light, the p-polarized light component of the internal reflected light is transmitted through the polarization filter 116.

Figure 10:
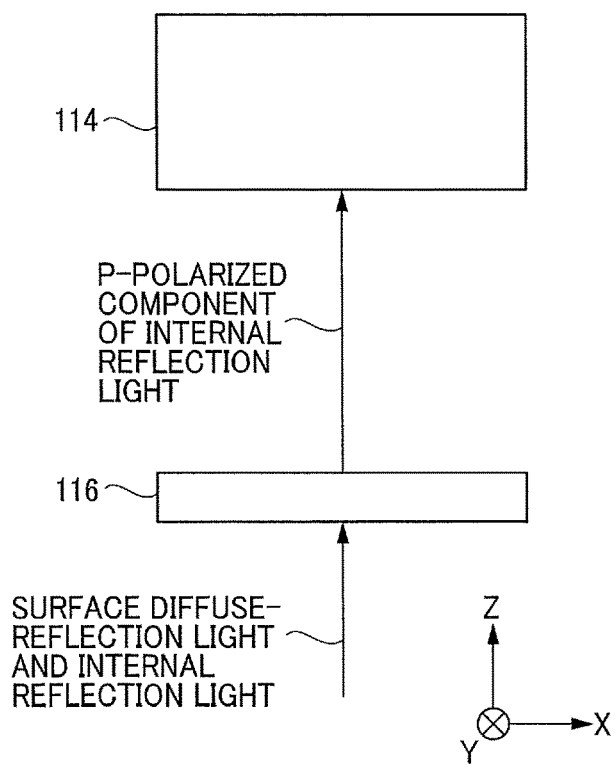
FIG. 10 is a diagram illustrating light transmitted through the polarization filter.

FIG. 10 is a diagram illustrating light transmitted through the polarization filter.

The p-polarized light component included in the internal reflected light is received by the light receiver 114. Hereinafter, the p-polarized component included in the internal reflected light is also referred to as "p-polarized internal reflected light". The s-polarized component included in the internal reflected light is also referred to as "s-polarized internal reflected light".

Returning back to FIG. 9, reflected light in which surface specular reflected light, surface diffuse reflected light, and internal reflected light are mixed is incident on the light receiver 113. At the light receiving position, since the light amount of the surface diffuse reflected light and the light amount of the internal reflected light are very small compared to the light amount of the surface specular reflected light, the light receiving amount of the light receiver 113 is treated as the light amount of the surface specular reflected light.

The light receiver 115 is disposed at a position at which surface diffuse reflected light and internal reflected light are received. For example, an angle $\Psi 3$ formed by a line L3 connecting the illumination center and the center of the light receiver 115 illustrated in FIG. 7 and the front surface of the recording medium P is 120°. The center of the light source 111, the illumination center, and the center of the light receiver 115 are substantially on the same plane.

The polarization filter 117 is disposed on the optical path of the surface diffuse reflected light and the internal reflected light. The polarization filter 117 is a polarization filter that transmits p-polarized light and blocks s-polarized light. The light receiver 118 is disposed on the optical path of the light transmitted through the polarization filter 117. Accordingly, the light receiver 118 receives the p-polarized light component included in the internal reflected light.

For example, an angle $\Psi 4$ formed by a line L4 connecting the illumination center, the center of the polarization filter 117, and the center of the light receiver 118 illustrated in FIG. 7 and the front surface of the recording medium P is 150°. The center of the light source 111, the illumination center, the center of the polarization filter 117, and the center of each light receiver are substantially on the same plane.

Referring back to FIG. 4, the light receiver 160 is disposed at a position at which the light receiver 160 receives transmitted light transmitted through the recording medium P among the light emitted from the light source 111 to the recording medium P. Information from the light receiver 160 that receives transmitted light is included in addition to information from the light receivers 113, 114, 115, and 118 that receive reflected light, thus allowing characteristic information of the recording medium P to be measured with high accuracy.

For example, the thickness of the recording medium P may be used as the characteristic information of the recording medium P obtained based on the amount of transmitted light received by the light receiver 160. When the recording medium P is not inserted into the opening 102 of the measuring apparatus 10 and the recording medium P is not present between the light source 111 and the light receiver 160, a certain amount of light from the light source 111 is received by the light receiver 160.

When the recording medium P is inserted into the opening 102 and positioned between the light source 111 and the light receiver 160, the amount of light received by the light receiver 160 changes according to the thickness of the recording medium P. Based on the amount of received light at this time, the controller 180 can obtain the thickness of the recording medium P using a preset conversion formula or conversion table for converting the amount of received light into the amount of thickness.

Further, the measuring apparatus 10 includes the thickness measuring sensor 170 that detects the thickness of the recording medium P inserted into the opening 102, separately from the light-amount measuring sensor 110.

Figure 11:
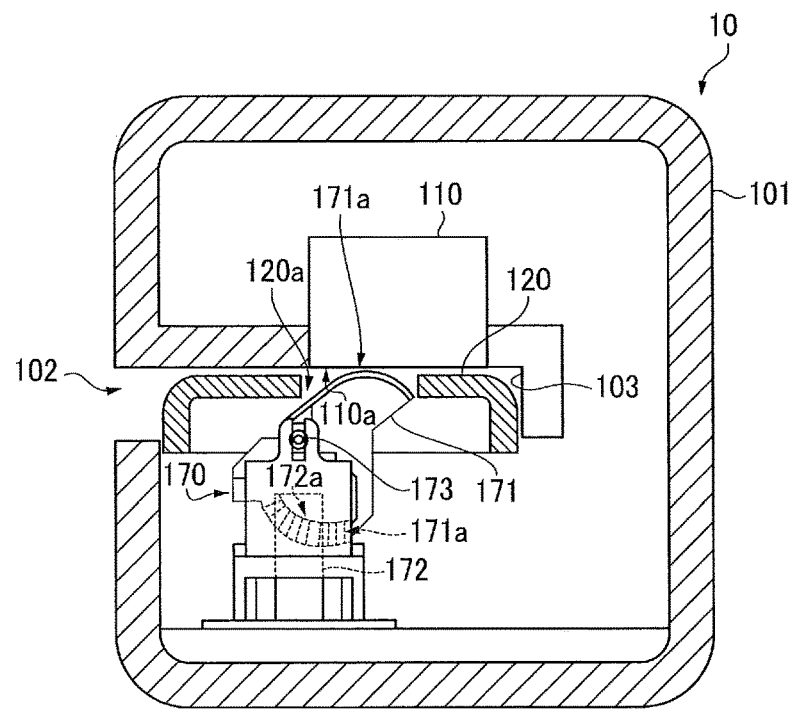
FIG. 11 is a cross-sectional view illustrating an example of the measuring apparatus.

FIG. 11 is a cross-sectional view of a measuring apparatus according to an embodiment of the present disclosure. Specifically, FIG. 11 is a cross-sectional view of the measuring apparatus 10 taken at the position of a slit 120a formed in the recording-medium mount table 120. In FIG. 11, the biasing member 150 (see FIG. 3) that urges the recording-medium mount table 120 is not illustrated.

The thickness measuring sensor 170 is an encoder as a displacement amount detector that detects a displacement amount corresponding to the thickness. The thickness measuring sensor 170 includes a feeler 171 in which a plurality of slits 171b are formed at a constant angular pitch, and a transmissive optical sensor 172 that detects the slits 171b of the feeler 171.

Figure 12:
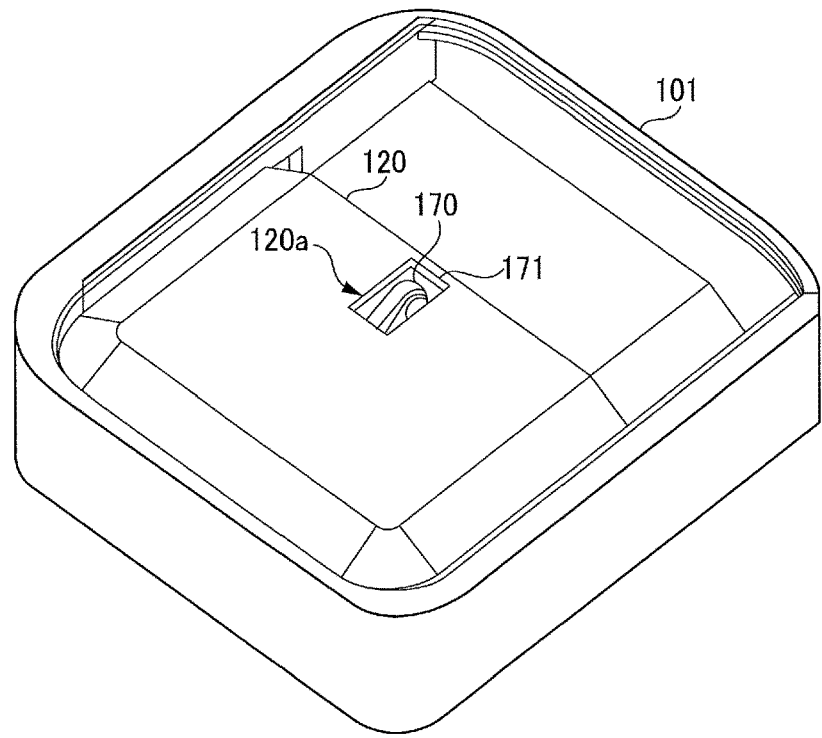
FIG. 12 is a perspective view illustrating an example of a lower portion of the measuring apparatus.

FIG. 12 is a perspective view illustrating an example of a lower portion of the measuring apparatus.

An upper portion of the feeler 171 of the thickness measuring sensor 170 is exposed to the outside from the slit 120a formed in the recording-medium mount table 120 so as to be positioned on an insertion path of the recording medium P inserted into the opening 102. When the recording medium P is not inserted into the opening 102, the feeler 171 is positioned at an initial position at which an upper end 171a of the feeler 171 is in contact with a lower surface 110a of the light-amount measuring sensor 110.

When the feeler 171 is positioned at the initial position, the recording medium P is not sandwiched between the feeler 171 and the light-amount measuring sensor 110, and thus the thickness of the recording medium P is measured as "0" by the thickness measuring sensor 170.

Figure 13A:
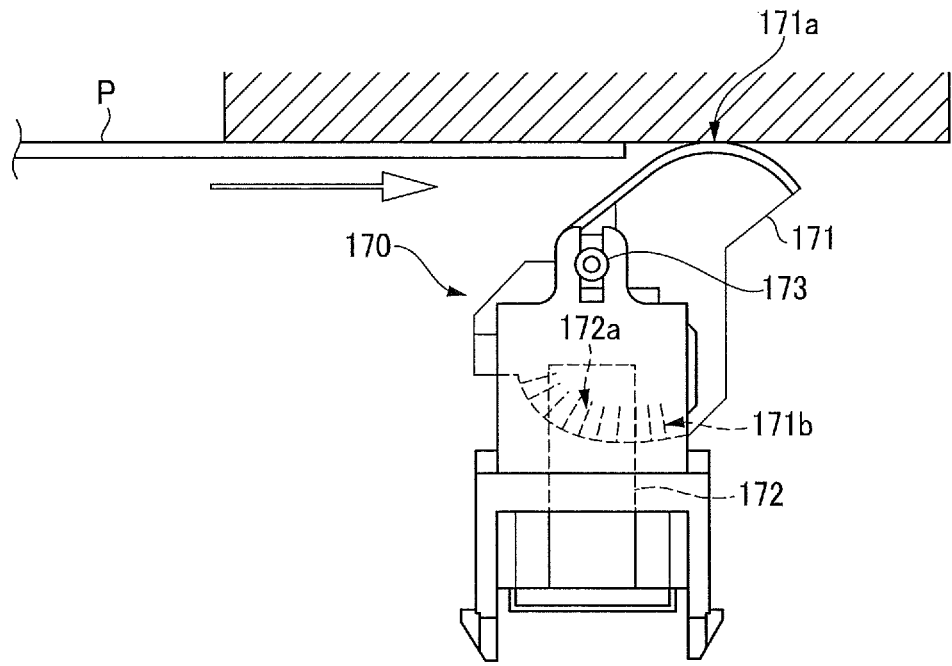
FIG. 13A is a diagram illustrating an operation of a thickness detection sensor.
Figure 13B:
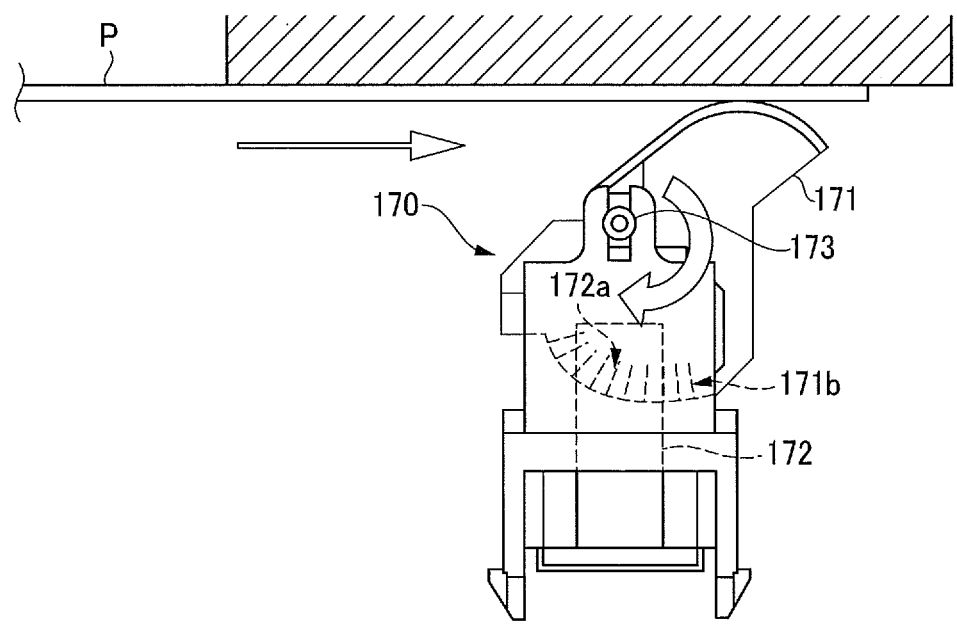
FIG. 13B is another diagram illustrating the operation of the thickness detection sensor.

FIG. 13A is a diagram illustrating an operation of a thickness detection sensor. FIG. 13B is another diagram illustrating the operation of the thickness detection sensor.

As illustrated in FIG. 13A, when the recording medium P is inserted into the opening 102 and the recording medium P passes through a contact position between the upper end 171a of the feeler 171 and the lower surface 110a of the light-amount measuring sensor 110, the feeler 171 is pressed downward by the recording medium P. Accordingly, as illustrated in FIG. 13B, the feeler 171 rotates clockwise in FIG. 13B about a rotation shaft 173, and the recording medium P is sandwiched between the feeler 171 and the light-amount measuring sensor 110.

The thickness measuring sensor 170 detects, with the optical sensor 172, the slit 172b passing through the position facing the sensor portion 172a of the optical sensor 172, thereby measuring the rotation amount of the feeler 171. The thickness measuring sensor 170 converts the rotation amount measured in this manner into a value indicating the thickness by a predetermined arithmetic expression or the like, thus obtaining the thickness of the recording medium P.

The thickness measuring sensor 170 is not limited to the configuration described above, and may be any displacement sensor capable of measuring the thickness of the recording medium P.

Next, functions of the image forming apparatus 30 are described.

Figure 14:
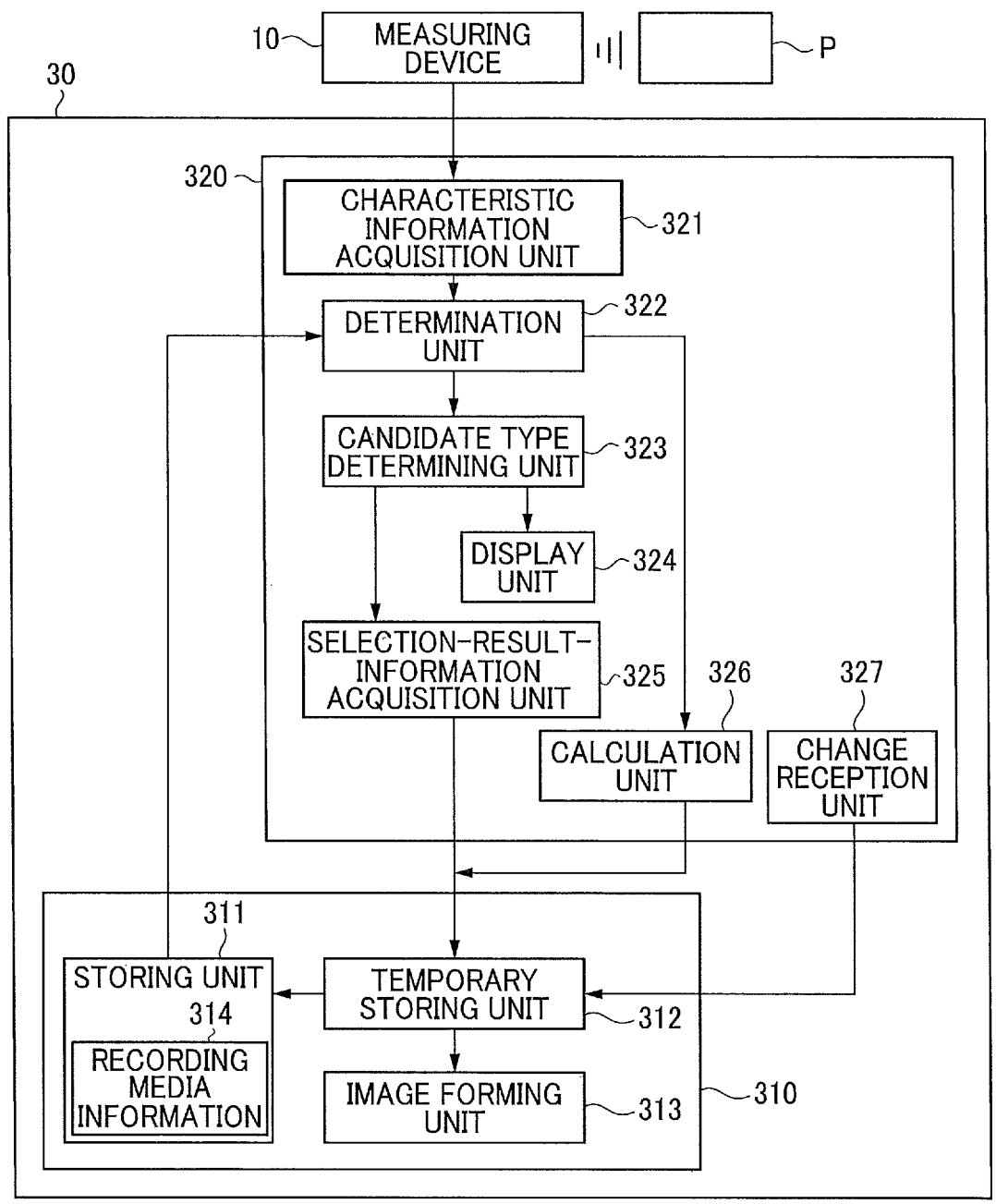
FIG. 14 is a diagram illustrating an example of functions of the image forming apparatus.
Figure 15:
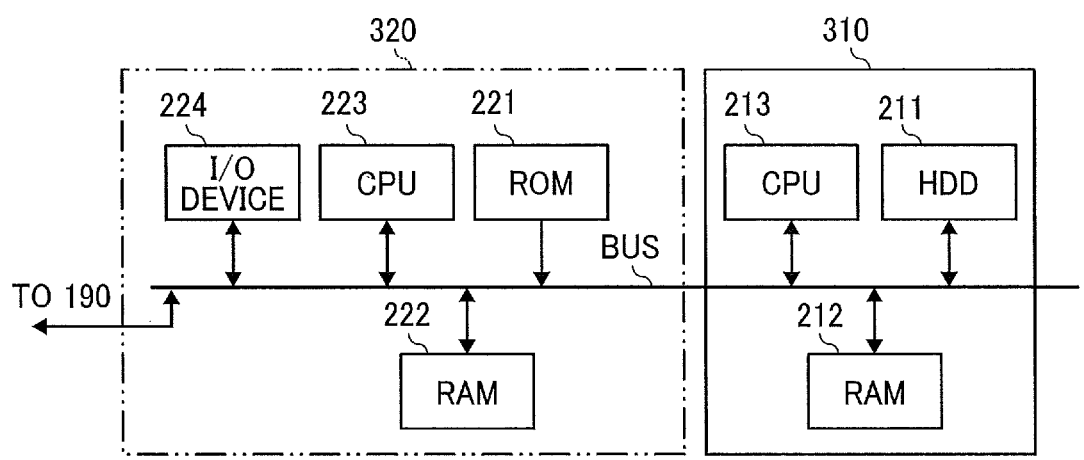
FIG. 15 is a diagram illustrating an example of a hardware configuration related to the functions of FIG. 14 in the image forming apparatus.

FIG. 14 is a diagram illustrating an example of functions of the image forming apparatus. FIG. 15 is a diagram illustrating an example of a hardware configuration related to the functions of FIG. 14 in the image forming apparatus.

The image forming apparatus 30 includes the operation unit 320 and the main unit 310.

The operation unit 320 includes a characteristic information acquisition unit 321, a determination unit 322, a candidate type determining unit 323, a display unit 324, a selection-result-information acquisition unit 325, a calculation unit 326, and a change reception unit 327. In the present embodiment, the characteristic information acquisition unit 321, the determination unit 322, the candidate type determining unit 323, the selection-result-information acquisition unit 325, and the calculation unit 326 are implemented by executing programs with a central processing unit (CPU) 223 illustrated in FIG. 15. Alternatively, the characteristic information acquisition unit 321, the determination unit 322, the candidate type determining unit 323, the selection-result-information acquisition unit 325, and the calculation unit 326 are implemented by, for example, an application specific integrated circuit (ASIC). For example, as illustrated in FIG. 15, the CPU 223 uses a random access memory 222 as a working area to execute a program stored in a read only memory (ROM) 221, thus achieving the functions as follows.

The characteristic information acquisition unit 321 acquires characteristic information of the measured recording medium. Specifically, the characteristic information acquisition unit 321 receives the characteristic information of the recording medium P from the measuring apparatus 10.

The determination unit 322 acquires recording medium information 314 from a storing unit 311 of the main unit 310, and calculates a matching rate indicating the degree of matching between the characteristic information acquired by the characteristic information acquisition unit 321 and the characteristic information included in the recording medium information 314. The determination unit 322 determines whether the type matching the recording medium P is included in the recording medium information 314 based on the calculated matching rate.

The recording medium information 314 is information in which type information indicating a type of a recording medium, characteristic information, and image forming condition information indicating an image forming condition are associated with each other. A specific example of the recording medium information 314 is described later.

When the determination unit 322 determines that the type matching the characteristic information is included in the recording medium information 314, the candidate type determining unit 323 determines a candidate type indicating a candidate for the type of the recording medium to be used based on the calculated matching rate.

When the candidate type determining unit 323 determines two or more candidate types, the display unit 324 displays the matching rate for each candidate type and is implemented with an input/output (I/O) device 224 illustrated in FIG. 15. Specific examples of the displayed information are described later.

The selection-result-information acquisition unit 325 acquires selection result information indicating a result of selection of the type to be used. Specifically, the selection-result-information acquisition unit 325 acquires information indicating the type of the recording medium used for image formation selected by the user who has viewed information such as the matching rate displayed on the display unit 324.

The selection-result-information acquisition unit 325 stores, in a temporary storing unit 312, the type information, the characteristic information, the image forming condition information, and the like included in the recording medium information indicated by the acquired selection result.

The calculation unit 326 applies preset calculation criteria to the characteristic information acquired by the characteristic information acquisition unit 321 to calculate image forming conditions. Specifically, when the determination unit 322 determines that the type matching the characteristic information is not included in the recording medium information 314, the calculation unit 326 calculates applies preset calculation criteria to the characteristic information to calculate the image forming conditions. A specific example of the calculation criteria is described later.

The calculation unit 326 stores, in the temporary storing unit 312, the characteristic information acquired by the characteristic information acquisition unit 321 and the image forming condition information indicating the calculated image forming condition.

The change reception unit 327 receives an operation of changing the image forming condition from the user and is implemented with the I/O device 224 illustrated in FIG. 15. Specifically, as described later, the image forming condition information is stored in the temporary storing unit 312 of the main unit 310. The change reception unit 327 changes the image forming condition information stored in the temporary storing unit 312 in response to a user operation.

The main unit 310 includes the storing unit 311, the temporary storing unit 312, and an image forming unit 313.

The storing unit 311 stores various types of information necessary for image formation and is implemented with a hard disk drive (HDD) 211 illustrated in FIG. 15. Specifically, the storing unit 311 stores the recording medium information 314.

The temporary storing unit 312 temporarily stores control values and the like necessary for controlling image formation every time the image forming unit 313 executes image formation, and is implemented with a random access memory (RAM) 212 illustrated in FIG. 15. Specifically, as described above, according to the determination result of the determination unit 322, the temporary storing unit 312 stores the type information, the characteristic information, the image forming condition information, and the like included in the recording medium information indicated by the selection result acquired by the selection-result-information acquisition unit 325, or stores the characteristic information acquired by the characteristic information acquisition unit 321 and the image forming information indicating the image forming condition calculated by the calculation unit 326.

When the characteristic information acquired by the characteristic information acquisition unit 321 and the image formation information indicating the image formation condition calculated by the calculation unit 326 are stored in the temporary storing unit 312, the main unit 310 may add the characteristic information and the image formation information stored in the temporary storing unit 312 to the recording medium information 314 stored in the storing unit 311. In this case, the main unit 310 may complement, as the type information, information that can be distinguished from the type information stored in advance.

The image forming unit 313 forms an image on the recording medium P based on the image forming condition information stored in the temporary storing unit 312.

Although the storing unit 311 and the temporary storing unit 312 are configured as separate storage units, the storing unit 311 and the temporary storing unit 312 may be configured as a single storing unit. Such a configuration can reduce the number of storing units provided in the image forming apparatus 30, thus allowing space saving, cost reduction, and the like to be achieved. On the other hand, in the configuration in which the storing unit 311 and the temporary storing unit 312 provided as separate storing units, it is only necessary to restore information stored in one of the storage units when an abnormality occurs in various types of information stored in the storing unit 311 and the temporary storing unit 312. Therefore, information restoration performance can be enhanced.

Next, the operation of the image forming apparatus 30 is described with reference to drawings.

Figure 16:
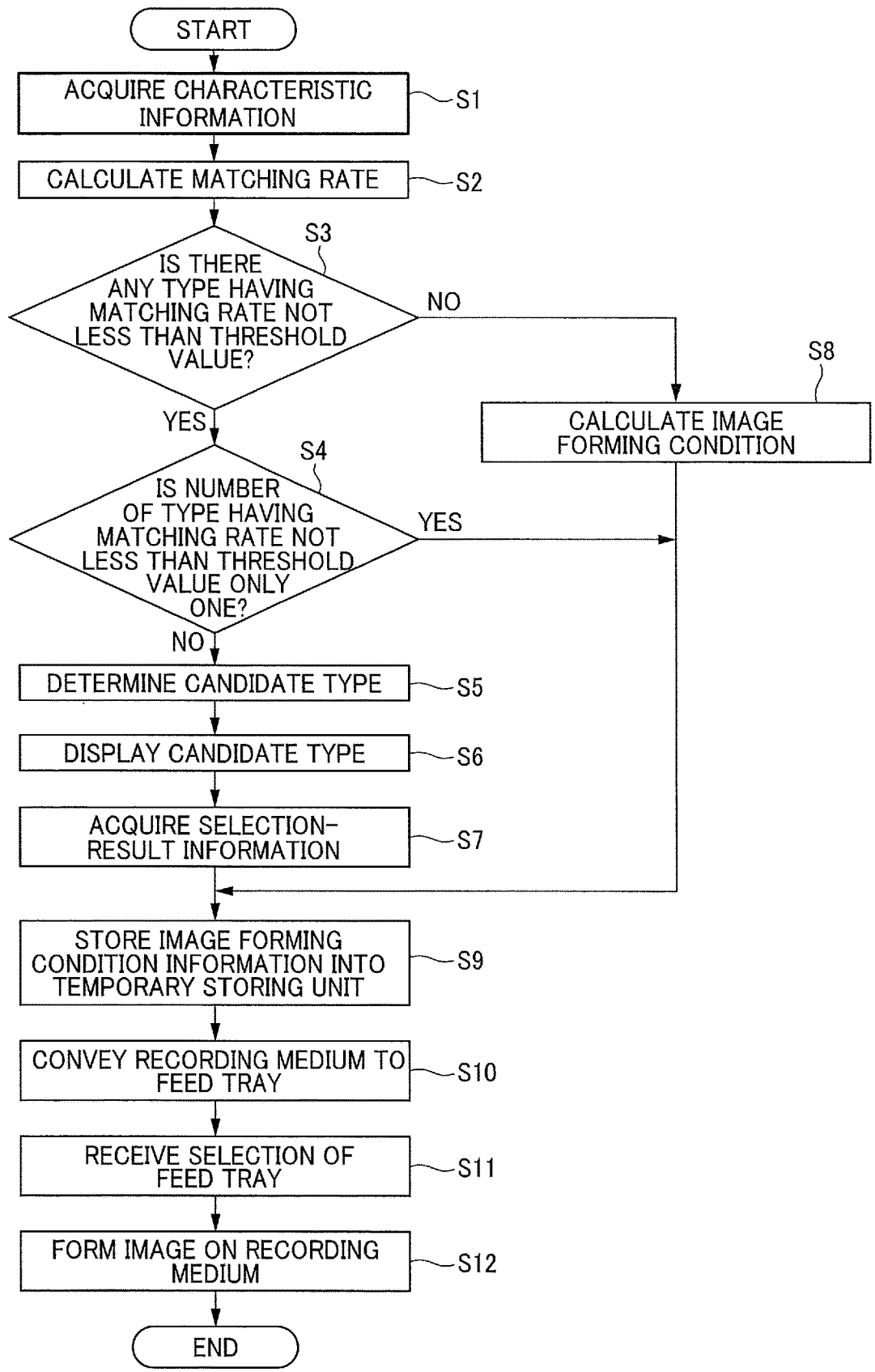
FIG. 16 is a diagram illustrating a process flow of an image forming process according to an embodiment of the present disclosure.

FIG. 16 is a diagram illustrating an example of a process flow of an image forming process.

When the user sets a recording medium P to be printed to the measuring apparatus 10, the measuring apparatus 10 measures characteristic information of the recording medium P and transmits the measured characteristic information to the image forming apparatus 30. The image forming apparatus 30 starts the image forming process illustrated in FIG. 16 in response to an operation by the user.

The characteristic information acquisition unit 321 of the operation unit 320 acquires characteristic information from the measuring apparatus 10 (step S1). Next, the determination unit 322 calculates a matching rate (step S2). For example, the determination unit 322 acquires the recording medium information 314 from the storing unit 311 of the main unit 310, and calculates the matching rate between the characteristic information included in the acquired recording medium information 314 and the characteristic information acquired in the step S1 for each type.

FIG. 17 is a diagram illustrating an example of recording medium information.

The recording medium information 314 includes, as main items, type information, characteristic information, and image forming condition information. Further, the type information includes, as small items, for example, type name, size, basis weight, classification, and coating type.

The value of the item "type name" is a text indicating the name of the type. For example, when the recording medium is a printing sheet of paper, the value of the item "type name" is a name indicating the type of the sheet such as "plain paper B".

The value of the item "size" is a text indicating the size. For example, when the recording medium is a printing sheet of paper, the value of the item "size" is a name indicating the size of the sheet of paper.

The value of the item "basis weight" is a text indicating the thickness. For example, when the recording medium is printing paper, the value of the item "basis weight" is a numerical value indicating the thickness of paper.

The value of the item "classification" is a text indicating a classification. For example, when the recording medium is printing paper, a text indicating a rough classification of paper such as "plain paper".

The value of the item "coating type" is a text indicating the type of coating and the presence or absence of coating. For example, when the recording medium is a printing sheet of paper, the value of the item "coating type" is a text indicating the type of coating applied to the surface of the printing sheet of paper, such as "gloss coating".

The characteristic information is information indicating a characteristic or feature of the recording medium indicated by the type information. For example, the characteristic information includes, as the small items A to F, the light amounts of the specular reflected light, the surface diffusion light, and the like described above, and the thickness of the recording medium.

The image forming condition information is information indicating conditions for forming an image on the recording medium indicated by the type information. Specifically, the image forming condition information includes, for example, a transfer voltage value and a fixing temperature as small items.

The values of the items "transfer voltage value", "fixing temperature", and the like included in the image forming condition information are values set in advance as appropriate image forming conditions:

Referring back to FIG. 16, in step S2, the determination unit 322 compares the characteristic information included in the recording medium information 314 with the characteristic information acquired in step S1, and calculates a matching rate by comparing, for example, the sum of squares of differences in the above-described items between the characteristic information included in the recording medium information 314 with the characteristic information acquired in step S1.

The determination unit 322 determines whether there is a type whose matching rate is equal to or greater than a threshold T1 (step S3). The threshold T1 is set in advance to a value, for example, 80%.

When the determination unit 322 determines that there is a type whose matching rate is equal to or greater than the threshold T1 (YES in step S3), the determination unit 322 further determines whether the number of types whose matching rate is equal to or greater than the threshold T1 is only one (step S4).

When the determination unit 322 determines that the number of types whose matching rate is equal to or greater than the threshold T1 is not one (NO in step S4), the candidate type determining unit 323 determines a candidate type (step S5). For example, the candidate type determining unit 323 determines, as candidate types indicating candidates for the type of the recording medium to be used, types for which the calculated matching rate is equal to or greater than a threshold T2. The threshold value T2 is set in advance and may be the same as the threshold value T1 or may be a value larger than the threshold value T1, for example, 90%.

Next, the display unit 324 displays the determined candidate types (step S6).

FIG. 18 is a diagram illustrating an example of display on the display unit.

The display unit 324 displays the type information of the candidate types and the matching rate calculated for each candidate type. The display unit 324 may display the candidate types in descending order of the matching rate.

Returning to FIG. 16, next, the selection-result-information acquisition unit 325 acquires selection result information (step S7). Specifically, when the user performs an operation of selecting a type to be used from among the candidate types displayed on the display unit 324, the selection-result-information acquisition unit 325 acquires selection result information indicating a selection result by the user.

The selection-result-information acquisition unit 325 stores the image forming condition information and the like in the temporary storing unit 312 (step S9). Specifically, the selection-result-information acquisition unit 325 stores the type information, the characteristic information, and the image forming condition information included in the recording medium information 314 of the selected type in the temporary storing unit 312.

In this case, since the information stored in the temporary storing unit 312 is stored in the storing unit 311, the selection-result-information acquisition unit 325 may store, in the temporary storing unit 312, an identifier such as a record identification (ID) for identifying the record of the recording medium information 314 stored in the storing unit 311.

In addition, in step S4, when the determination unit 322 determines that the number of types whose matching rate is equal to or greater than the threshold T1 is only one (YES in step S4), the process proceeds to step S9. For example, the determination unit 322 stores, in the temporary storing unit 312, the type information, the characteristic information, and the image forming condition information included in the recording medium information 314 of the type whose matching rate is equal to or greater than the threshold T1.

In step S3, when the determination unit 322 determines that there is no type whose matching rate is equal to or greater than the threshold T1 (NO in step S3), the calculation unit 326 calculates image forming conditions (step S8).

For example, the calculation unit 326 applies predetermined calculation criteria to the characteristic information acquired in step S1 to calculate image forming conditions. Specifically, the calculation criteria are calculation formulas for calculating various control values included in the image forming conditions from the measurement values included in the characteristic information.

For example, when the amount of specular reflected light is $X_1$, the amount of surface diffusion light is $X_2$, the amount of surface multiple diffusion light is $X_3$, the amount of internal diffusion light is $X_4$, the amount of transmitted light is $X_5$, and the depth is $X_6$, the calculation criterion is represented by the following Formula (1) for calculating each control value $Y_n$.

$$Y_n = (a_n \times X_1) + (b_n \times X_2) + (c_n \times X_3) + (d_n \times X_4) + (e_n \times X_5) + (f_n \times X_6) + Z_n \quad \text{Formula (1)}$$

The coefficients $a_n$, $b_n$, $c_n$, $d_n$, $e_n$, $f_n$ and the intercept $Z_n$ are set in advance by analyzing the result of the test by regression analysis or the like.

For example, when the coefficients and intercept of the fixing temperature $Y_1$ are $a_1 = -0.0518$, $b_1 = 0$, $c_1 = 0$, $d_1 = 0$, $e_1 = 0.04671$, $f_1 = 0.01844$, and $Z_1 = 150$, the calculation formula for calculating $Y_1$ is as represented in the following Formula (2).

$$Y_1 = (-0.0518 \times X_1) + (0 \times X_2) + (0 \times X_3) + (0 \times X_4) + (0.04671 \times X_5) + (0.01844 \times X_6) + 150 \quad \text{Formula (2)}$$

When the characteristic information acquired in step S1 is $X_1 = 83$, $X_2 = 944$, $X_3 = 2009$, $X_4 = 2386$, $X_5 = 674$, and $X_6 = 332$, the calculation unit 326 applies the characteristic information to Formula (2) and calculates the fixing temperature as about 183° C. by $Y1 = (-0.0518 \times 83) + (0 \times 944) + (0 \times 2009) + (0 \times 2386) + (0.04671 \times 674) + (0.01844 \times 332) + 150$.

Similarly, the calculation unit 326 calculates a transfer bias, a conveyance speed, and the like as image forming conditions. Formula (1) is an example of a linear expression obtained by multiplying the measurement values included in the characteristic information by coefficients.

Following step S8, the calculation unit 326 proceeds to step S9, and stores the characteristic information acquired in step S1 and the image forming condition information indicating the calculated image forming conditions in the temporary storing unit 312.

Next, the main unit 310 conveys the recording medium P to the feed tray 307 (step S10). The operation unit 320 receives a selection of the feed tray 307 by the user (step S11). The image forming unit 313 forms an image on the recording medium P of the selected feed tray 307 (step S12).

According to the image forming system 1 of the present embodiment, the image forming apparatus 30 calculates image forming conditions based on the characteristic information of the recording medium P measured by the measuring apparatus 10, and forms an image on the recording medium P based on the calculated image forming conditions. Such a configuration can flexibly adapt to recording media having various characteristics to form images on the recording media.

Further, the image forming apparatus 30 determines whether a type suitable for the recording medium P is included in the recording medium information 314 stored in advance. Accordingly, in a case in which appropriate image forming conditions have already been set, such as a case in which a printing sheet of paper of a brand that is frequently used is used, the image forming apparatus 30 can use the set image forming conditions, and thus can achieve image formation with higher accuracy.

Further, the image forming apparatus 30 can achieve image formation reflecting the user's intention by displaying the calculation result of the matching rate and receiving the selection result of the user.

The calculation criterion of the image forming condition by the calculation unit 326 described above is an example, and any other suitable criterion may be used. For example, a learning model generated by machine learning may be used as the calculation criterion. Specifically, the learning model may be a learning model in which the characteristic information measured by the measuring apparatus 10 is an input value and various control values included in the image forming condition are output values.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. The elements of the above-described embodiments can be modified without departing from the gist of the present disclosure, and can be appropriately determined according to the application form.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:
    processing circuitry configured to:
        acquire characteristic information of a recording medium measured; and
        apply a preset calculation criterion to the characteristic information to calculate an image forming condition; and
    an image forming device configured to form an image on the recording medium based on the image forming condition calculated by the processing circuitry,
    wherein the preset calculation criterion is a criterion for calculating a value indicating the image forming condition from a linear expression obtained by multiplying a measurement value included in the characteristic information by a coefficient.

2. The image forming apparatus according to claim 1, further comprising a memory configured to store recording medium information in which type information indicating a type of a recording medium, characteristic information, and image forming condition information indicating an image forming condition are associated with each other,
    wherein the processing circuitry is configured to:
        calculate a matching rate indicating a degree of matching between the characteristic information acquired from the recording medium measured and the characteristic information included in the recording medium information; and
        determine whether a type matching the characteristic information acquired from the recording medium measured is included in the recording medium information, based on the matching rate calculated,
    wherein the image forming device is configured to:
        form an image on the recording medium measured, based on the image forming condition included in the recording medium information, when the processing circuitry determines that the type matching the characteristic information acquired from the recording medium measured is included in the recording medium information; and
        form an image on the recording medium based on the image forming condition calculated by the processing circuitry, when the processing circuitry determines that the type matching the characteristic information acquired from the recording medium measured is included in the recording medium information.

3. The image forming apparatus according to claim 2, further comprising a display configured to display the matching rate,
    wherein the processing circuitry is configured to determine a candidate type indicating a candidate for a type of a recording medium to be used, based on the matching rate calculated, when the processing circuitry determines that the type matching the characteristic information acquired from the recording medium measured is included in the recording medium information,
    wherein the display is configured to display the matching rate for each candidate type when the processing circuitry determines two or more types candidates for the type of the recording medium to be used,
    wherein the processing circuitry is configured to acquire selection result information indicating a result of selection of a type to be used, and
    wherein the image forming device is configured to form an image on the recording medium based on image forming condition information associated with type information indicating the type to be indicated by the selection result information.

4. The image forming apparatus according to claim 1,
    wherein the characteristic information includes two or more measurement values of an amount of specular reflected light, an amount of diffuse reflected light, an amount of internal reflected light, and an amount of transmitted light of light with which the recording medium is irradiated, and a thickness of the recording medium.

5. The image forming apparatus according to claim 1,
    wherein the image forming condition is a value indicating a fixing temperature, a transfer bias, or a conveyance speed.

6. An image forming method, comprising:
    acquiring characteristic information of a recording medium measured;
    applying a preset calculation criterion to the characteristic information to calculate an image forming condition; and forming an image on the recording medium based on the image forming condition calculated, wherein the preset calculation criterion is a criterion for calculating a value indicating the image forming condition from a linear expression obtained by multiplying a measurement value included in the characteristic information by a coefficient.

7. An image forming system, comprising:

an image forming apparatus; and a measuring apparatus configured to measure characteristic information of a recording medium and transmit the characteristic information measured, to the image forming apparatus, the image forming apparatus including:
  processing circuitry configured to acquire the characteristic information from the measuring apparatus and apply a preset calculation criterion to the characteristic information to calculate an image forming condition; and
  an image forming device configured to form an image on the recording medium based on the image forming condition calculated by the processing circuitry,
  wherein the preset calculation criterion is a criterion for calculating a value indicating the image forming condition from a linear expression obtained by multiplying a measurement value included in the characteristic information by a coefficient.

* * * * *